June 17, 1952　　　　J. W. ROBERTS ET AL　　　　2,601,057
MECHANICAL CHICKEN FEEDER
Filed July 21, 1948　　　　　　　　　　　　3 Sheets-Sheet 2
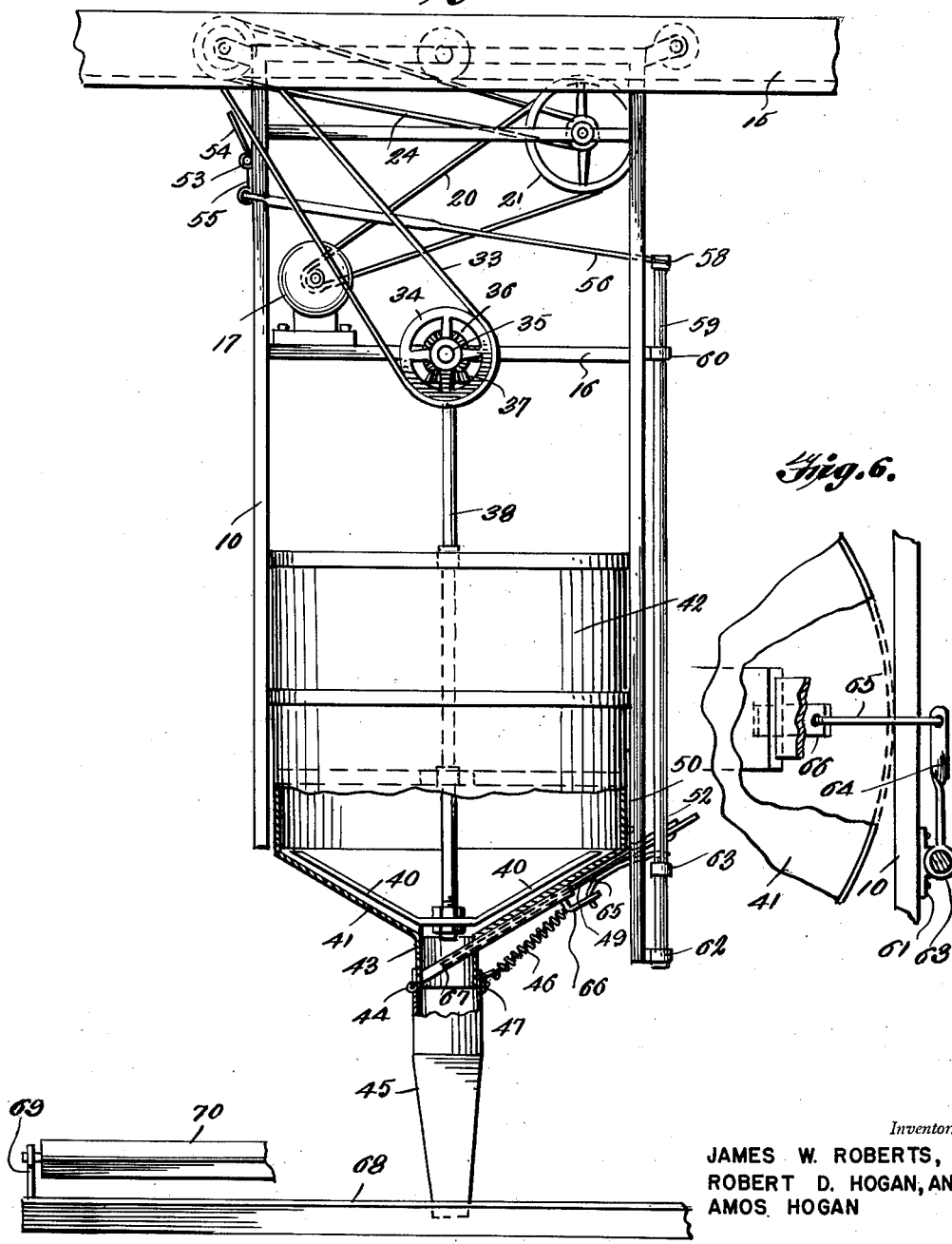
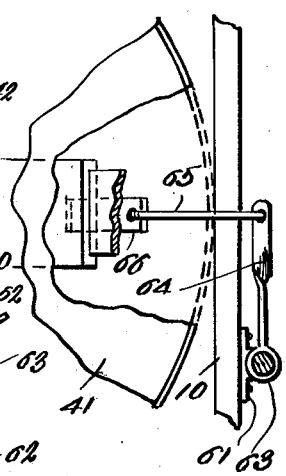
Inventors
JAMES W. ROBERTS,
ROBERT D. HOGAN, AND
AMOS HOGAN
By *Patrick D. Beavers*
Attorney June 17, 1952     J. W. ROBERTS ET AL     2,601,057
MECHANICAL CHICKEN FEEDER Filed July 21, 1948     3 Sheets-Sheet 3

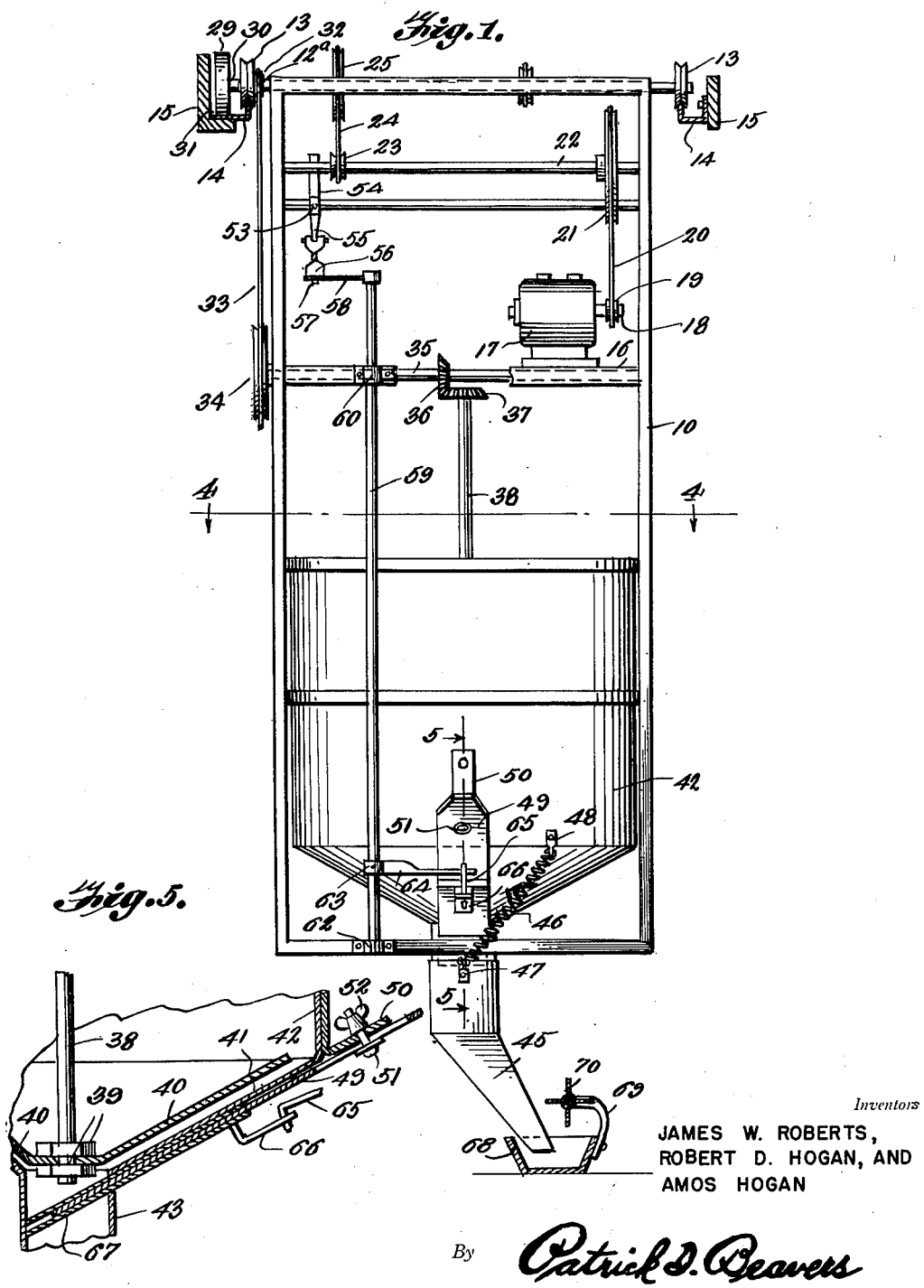

Inventors
JAMES W. ROBERTS,
ROBERT D. HOGAN, AND
AMOS HOGAN

By *Patrick D. Beavers*

Attorney

Patented June 17, 1952

2,601,057

UNITED STATES PATENT OFFICE 2,601,057

MECHANICAL CHICKEN FEEDER

James W. Roberts, Robert D. Hogan, and Amos Hogan, Pekin, Ind.

Application July 21, 1948, Serial No. 39,886

2 Claims. (Cl. 119—51)

The present invention relates to mechanical chicken feeder and it consists in the combinations, constructions and arrangements of parts herein described and claimed.

It is an object of the present invention to provide a chicken feeder adapted to ride on rails and mechanically distribute feed into a trough positioned beneath the rails.

Another object of the invention is to provide a chicken feeder means for automatically stirring feed in a container forming a part of the invention.

Another object of the invention is the provision of a chicken feeder having novel means for regulating the flow of feed therefrom.

Another object of the invention is the provision of a chicken feeder having novel means and mechanism for cutting off the flow of feed from a spout forming a part of the invention.

Another object of the invention is the provision of a mechanical chicken feeder which is simple and economical in its construction and operation and efficient and effective in use.

Other and further objects of the invention will become apparent from a reading of the following specification taken in conjunction with the drawings, in which:

Figure 1 is a side elevational view of an embodiment of the invention,

Figure 2 is a front elevational view of the apparatus shown in Figure 1,

Figure 5 is an enlarged sectional view taken along line 5—5 of Figure 1, and

Figure 6 is an enlarged fragmentary sectional view illustrating certain details of construction.

Figure 3:
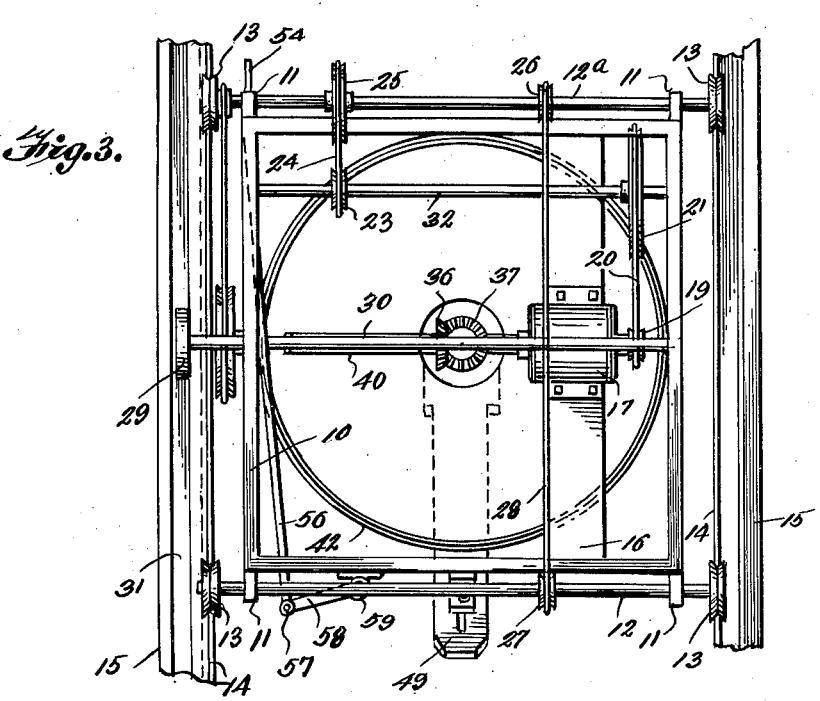
Figure 3 is a plan view of the apparatus forming the present invention.

Generally there is provided a mechanical chicken feeder comprising a frame having wheeled connection at its upper end with an overhead railway along which the apparatus is adapted to travel. A motor is carried by the frame and is connected by pulleys and belts to driving wheels on the track and to a vertical shaft having stirrer blades at its lower end which blades are positioned in the lower end of a container carried by the frame. The container discharges into a spout provided with an automatically operated shut-off valve. The spout is adapted to discharge into an elongated trough positioned on the ground beneath the rails and is hinged to prevent injury thereto when coming into contact with the ends of the trough. The trough is also provided with a gauge valve upon which the shut-off valve is slidably mounted and the gauge valve is provided with means whereby its position in the spout may be adjusted to regulate the flow of feed therethrough.

Referring more particularly to the drawings, there is shown therein a mechanical chicken feeder comprising a vertically extending open frame 10 which is substantially square in cross section. The upper end of the frame is provided with ears 11 in which are journaled a pair of transversely extending axles 12 and 12a having grooved wheels 13 affixed to the outer ends thereof and which are mounted upon rails 14 which are, in turn, affixed to a horizontally extending framework 15 supported in elevated position from the ground by suitable supports not shown in the drawings.

A platform 16 is mounted in the frame 10 and an electric motor 17 is supported thereon. The shaft 18 of the motor is provided with a pulley 19 connected by means of a belt 20 to a relatively large pulley 21 affixed to a shaft 22 journaled transversely in the frame 10 and having a relatively small pulley 23 also affixed thereto. The pulley 23 is connected by a belt 24 to a pulley 25 affixed to the shaft 12a which also carries a pulley 26 which is, in turn, connected with a pulley 27 affixed to the shaft 12 by means of a belt 28.

A guide wheel 29 is carried at one end of a shaft 30 revolubly and transversely mounted in the upper end of the frame 10 and lies in a groove 31 formed between one of the rails 14 and its adjacent framework 15.

The rail 12a is provided with a small pulley 32 which is connected by means of a belt 33 to a relatively large pulley 34 which is affixed to the outer end of a shaft 35 which is revolubly mounted in the frame 10 and which extends to a point adjacent the center of the frame and carries at its inner end a bevel gear 36 which is enmeshed with a bevel gear 37 mounted at the upper end of a vertically disposed shaft 38 the lower end of which has affixed thereto, by means of nuts 39, stirrer blades 40 which lie adjacent the sides of a conically shaped lower end 41 of a cylindrical feed container 42.

A pipe connection 43 is formed in the lower end of the conically shaped section 41 and has hinged, as indicated at 44, a chute 45 which is normally held in a vertical position by means of a spring 46 connected to a hook 47 affixed to the chute and to a hook 48 affixed to one side of the container 42.

A gauge valve 49 extends into the connection 43 and is adjustably connected to a bracket 50 by means of a bolt 51 provided with a wing nut 52, the bracket 50 being affixed to the side of the container 42.

At one side of the upper end of the frame 10 there is pivotally mounted, as indicated at 53, a bell crank lever having a trip arm 54 and a link arm 55 which latter is connected with a rod 56 whose other end is pivotally connected, as indicated at 57, to the outer end of a laterally extending arm 58 whose inner end is affixed to the upper end of a vertical shaft 59 journaled in a bracket 60 affixed to the frame 10 adjacent its upper end and in a bracket 61 formed in the lower end of the frame 10, as shown at 62.

Adjacent the lower end of the shaft 59 is affixed by a collar 63 a laterally extending arm 64 whose other end has pivotally connected thereto a link 65 which, in turn, connects with a bracket 66 affixed to the upper end of a cut-off valve 67 which is slidable upon and which encompasses the gauge valve 49.

The spout 45 has its lowermost end situated in an elongated trough which rests upon the ground in parallel relation to the rails 14 and which is provided with brackets 69 in which is revolubly mounted an anti-roosting device 70.

Figure 4:
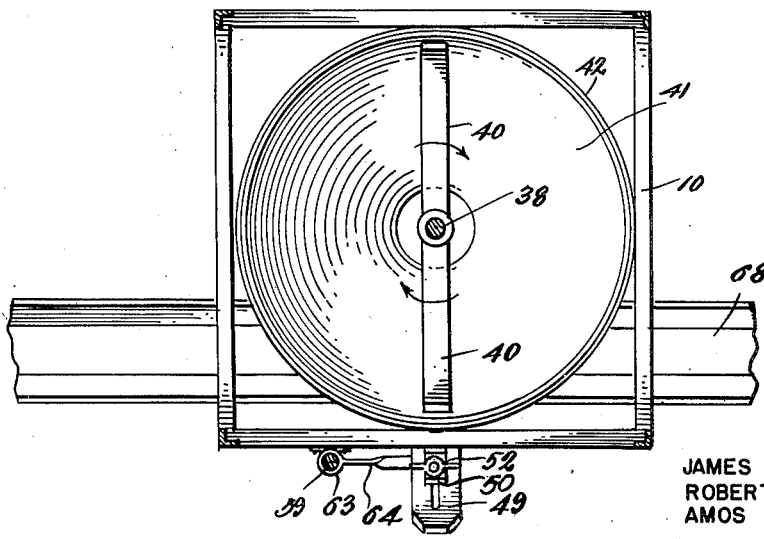
Figure 4 is a sectional view taken along line 4—4 of Figure 1.

The operation of the feeder is quite simple. First, the container 42 is loaded with grain or other feed to be dispensed to chickens. The gauge valve 49 is then positioned in the pipe connection 43 to allow for a certain flow of feed therethrough. When this has been positioned to the satisfaction of the operator, the bolt 51 is tightened to thereby lock the gauge valve. Thereupon the motor 17 is actuated to thus cause the wheels 13 to revolve through the agency of the pulley 18, belt 19, pulley 21, shaft 22, belt 24, pulley 25, shaft 12a, pulley 26, belt 28, pulley 27 and shaft 12. This causes the entire mechanism to travel upon the rails 14, thus causing the spout 45 to move longitudinally in the trough 68 and to distribute therein a preselected amount of feed from the container 42. While this action is in progress, the pulley 34 will be rotated through its belt connection 33 with the pulley 32 thus rotating the shaft 35 and consequently, the bevel gears 36 and 37 to thereby rotate the shaft 38 and the stirrer blades 40 affixed thereto, thus preventing the feed in the container from lumping. When the feeder has reached the end of its travel upon the rails 14, the trip arm 54 will come into contact with a detent (not shown) which will cause the bell crank to revolve thus moving the rod 56 to thereby cause the arm 58 and its shaft 59 to move in a counter-clockwise direction, as viewed, for example, in Figures 4 and 6. This action causes the lever 64 and the link 65 to move inwardly and thus, through the bracket 66 to move the cut-off valve 67 to closed position, as shown in Figure 5. Should the spout 45 come into contact with the end of the trough 68 or any other obstruction, it will revolve upon its hinge 44 against the action of the spring 46 which will return the trough to normal position when the obstruction has been passed.

While but one form of the invention has been shown and described herein, it will be readily apparent to those skilled in the art that many minor modifications may be made without departing from the spirit of the invention or the scope of the appended claims.

What is claimed is:

1. In an apparatus of the character described, a frame, a hopper carried by said frame, a trough mounted on the ground below said hopper, a spout extending from the hopper to the trough, means for regulating the flow of material from the hopper to the trough, and automatic means for cutting off the flow of material from the hopper to the trough, said means for regulating the flow of material from the hopper to the trough comprising a bracket mounted on said hopper adjacent said spout, a gauge valve slidably mounted upon a bracket and adapted to be moved transversely into and out of the spout, means on said bracket for locking the gauge valve in adjusted positions, and said automatic means for cutting off the flow of material from the hopper to the trough including a cut-off valve slidably mounted upon the gauge valve.

2. In an apparatus of the character described, a trough, a hopper mounted above said trough, means for moving said hopper in a path above said trough, a spout connected to the lower end of the hopper and extending into the trough, and means for protecting said spout from objects in said trough, said means including a hinged connection between said spout and said hopper, and a spring interconnecting the spring and the hopper and normally urging said spout to a vertically dependent position.

JAMES W. ROBERTS.
ROBERT D. HOGAN.
AMOS HOGAN.

REFERENCES CITED

The following references are of record in the file of this patent:

UNITED STATES PATENTS

| Number | Name | Date |
|---|---|---|
| 840,863 | Patterson | Jan. 8, 1907 |
| 1,043,786 | Moyer | Nov. 5, 1912 |
| 1,138,950 | Henderson | May 11, 1915 |
| 1,189,003 | Schnuck | June 27, 1916 |
| 1,284,310 | Gilbert | Nov. 12, 1918 |
| 1,398,336 | Mattson | Nov. 29, 1921 |
| 1,533,862 | Hyle | Apr. 14, 1925 |
| 1,597,314 | Howard et al. | Aug. 24, 1926 |
| 1,693,198 | Everist | Nov. 27, 1928 |
| 2,414,235 | MacManus | Jan. 14, 1947 |